United States Patent [19]

Franaszek et al.

[11] Patent Number: 4,929,940
[45] Date of Patent: May 29, 1990

[54] COLLISION CROSSBAR SWITCH

[75] Inventors: Peter A. Franaszek, Katonah; Christos J. Georgiou, White Plains, both of N.Y.

[73] Assignee: International Business Machines Corporation, Armonk, N.Y.

[21] Appl. No.: 275,164

[22] Filed: Nov. 18, 1988

[51] Int. Cl.⁵ .............................................. H04Q 1/00
[52] U.S. Cl. ...................... 340/825.020; 340/825.790; 340/825.800; 340/825.500
[58] Field of Search ............. 340/825.5, 825.8, 825.79, 340/825.89, 826, 827, 825.02; 370/58, 63, 68, 85; 379/241, 271, 306, 335, 291; 361/91; 371/11, 24

[56] References Cited

U.S. PATENT DOCUMENTS

4,605,928  8/1986  Georgiou ...................... 340/825.94
4,752,777  6/1988  Franaszek ..................... 340/825.79
4,785,396  11/1988  Murphy et al. ................ 340/825.5
4,821,258  4/1989  Fraser ............................... 370/60

Primary Examiner—Donald J. Yusko
Assistant Examiner—Dervis Magistre
Attorney, Agent, or Firm—Whitham & Marhoefer

[57] ABSTRACT

A high speed collision N×M tri-state crossbar switch having M collision busses uses contention detection at the destination. In the event of a collision of messages, remedial action can be taken such as rerouting colliding messages over an alternate path provided by a second interconnection network with contention resolution capability. Collision detection codes are transmitted prior to the transmission of messages to each input port. The tri-state output buses are monitored for the collison detection codes to detect an error. In order to prevent damage to driver transistors connected to the tri-state buses when a contention occurs, current limiting is provided to limit the current through the driver transistors to a predetermined level.

21 Claims, 6 Drawing Sheets

COLLISION CROSSBAR SWITCH

BACKGROUND OF THE INVENTION

1. Field of the Invention

The present invention generally relates to digital communications systems and, more particularly, to a high performance crossbar switch which uses contention detection at the destination and reroutes colliding messages over an alternate path provided by a second interconnection network with contention resolution capability.

2. Description of the Prior Art

High performance, multi-processor computer systems are characterized by multiple central processor units (CPUs) operating independently, but occasionally communicating with one another or with memory devices when data needs to be exchanged. The CPUs and the memory devices have input/output (I/O) ports which must be selectively connected to exchange data. The data exchanges occur frequently but at random times and occur between random combinations of CPUs and memory devices. Therefore, some kind of switching network is required to connect the ports for the relatively short period of the data exchange. This switching network must provide a high bandwidth so that the processing is not unduly delayed while the data is being exchanged. Furthermore, the connections are frequently made and broken, and delays that occur while waiting for a connection or delays incurred while the connection is being made can also impact the total capability of the parallel CPUs.

Figure 1:
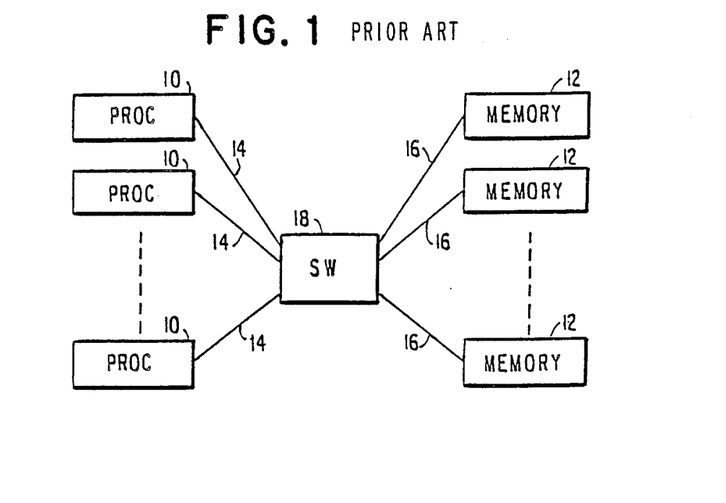
FIG. 1 is a block diagram illustrating a generalized multi-port switching system.

FIG. 1 is an illustration of one type of computer system to which the subject invention is directed. There are a large number of CPUs 10, each operating independently and in parallel with each other. In the past, it has been common to have the number N of parallel CPUs to be in the neighborhood of four. However, newer designs involve greater numbers N of CPUs of 256 ($2^8$) to 1,024 ($2^{10}$), or even greater. Each of the CPUs 10 occasionally requires access to one of the several memory devices 12. For the sake of illustration, the memory devices will be assumed to be equivalent and also of number N. Each CPU 10 has an I/O path 14 and each memory device 12 has an I/O path 16. The paths 14 and 16 can be buses and may be duplicated to provide full-duplex communication. The important consideration, however, is that a CPU 10, requiring access to a particular memory device 12, have its I/O path 14 connected to the I/O path 16 of the required memory device 12. This selective connection is performed by a switching network 18, which is central to the design for the distributed processing of the computer system illustrated in FIG. 1.

The use of a cross-point switch for the switching network 18 provides the required high bandwidth. The important feature of a cross-point switch is that it can simultaneously provide N connections from one side to the other, each selectively made. Although the complexity of a cross-point switch increases in proportion to $N^2$, the relative simplicity of the actual $N^2$ cross-points allows its fabrication in a currently available technology.

Christos J. Georgiou has described in U.S. Pat. No. 4,605,928 a cross-point switch composed of an array of smaller cross-point switches, each on a separate integrated circuit (IC). Although Georgiou describes a single-sided switch, as opposed to the double-sided switch of FIG. 1, Georgiou's switch can be used in the configuration of FIG. 1, or easily adapted thereto. With the cross-point switch of Georgiou, it is easily conceivable that the number N of ports to the switch can be increased to 1,024. Thus, the total bandwidth of the switch 18 would be 1,024 times the bandwidth of the transmission paths 14 and 16. The cross-point switch of Georgiou has the further advantage of being non-blocking. By non-blocking what is meant is that if a CPU 10 requires that its I/O path 14 be connected to the I/O path 16 of a memory 12 not currently connected, the switch 18 can provide that connection. Thus, a CPU 10 is not blocked by the switch 18 when it requires a connection to a memory device 12.

Georgiou has also described, in another U.S. Pat. No. 4,630,045, a controller for his cross-point switch. Georgiou's controller is designed to be very fast but it suffers from the deficiency of most cross-point switches that one controller is used for all N input ports. As a result, the controller must sequentially service multiple ports requesting connection through the cross-point switch. Therefore, once the demanded connection rate exceeds the speed of the controller, the controller becomes a bottleneck. This is because the controller is a shared resource. Even if the controller of Georgiou were redesigned to provide parallel subcontrollers, perhaps attached to each port, this parallel controller would nonetheless be dependent upon a single table, the port connection table, that keeps track of available connections through the switch. Thus, the port connection table is also a shared resource and limits the controller's speed for large values of N.

An alternative to the cross-point switch is the Delta network. Delta networks are defined, with several examples, by Dias et al. in an article entitled "Analysis and Simulation of Buffered Delta Networks", *IEEE Transactions on Computers*, vol. C-30, no. 4, April 1981, pp. 273–282. Patel also defines a Delta network in "Performance of Processor-Memory Interconnections for Multiprocessors", *IEEE Transactions on Computers*, vol. C-30, no. 10, October 1981, pp. 771–780. An example of a Delta network for packet switching is described by Szurkowski in an article entitled "The Use of Multi-Stage Switching Networks in the Design of Local Network Packet Switching", *1981 International Conference on Communications*, Denver, Col. (June 14–18, 1981). The Delta network will be described here with reference to the Omega switching network, described by Gottlieb et al. in an article entitled "The NYU Ultracomputer—Designing an MIMD Shared Memory Parallel Computer", *IEEE Transactions on Computers*, vol. C-32, no. 2, February 1983, pp. 175–189. This example is illustrated in FIG. 2.

Figure 2:
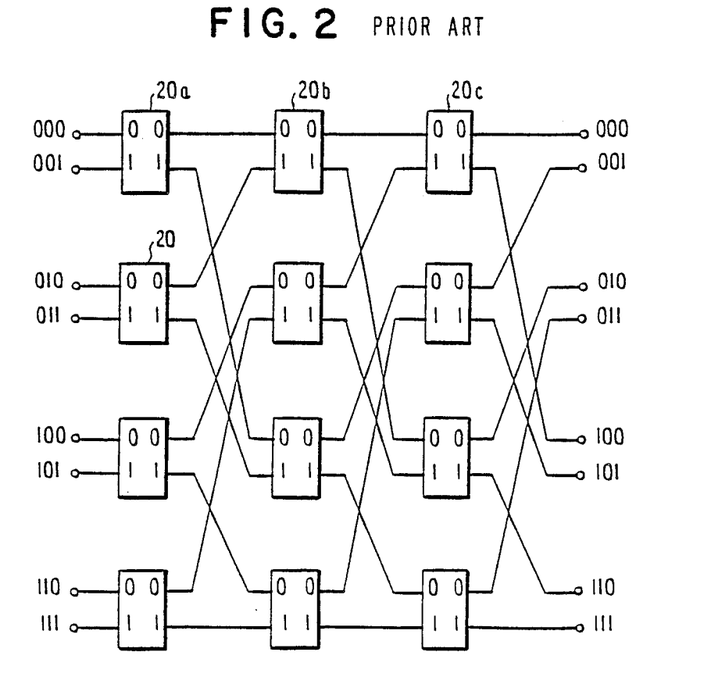
FIG. 2 is a schematic illustration of a Delta network.

In FIG. 2, there are eight ports on the left, identified by binary numbers, and eight ports on the right, similarly identified by binary numbers. Connecting the right hand and the left hand ports are three stages of switches 20. Each switch 20 is a 2×2 switch that can selectively connect one of the two inputs on one side to one of the two outputs on one side to one of the two outputs on the other side. The illustrated Delta network can provide a connection from any port on the right hand side to any port on the left hand side. Data is transmitted from one side to another in relatively small packets containing, in addition to the data, control information, including the address of the desired destination. By use of buffers within the switches 20, it is possible to decouple the switches of the different sections so that the control and transmission are pipelined between the stages of the 2×2 switches 20. Thus, the control function of the Delta network is potentially very fast and the delay introduced by the stages rises as a function of logN rather than the N dependence of the cross-point switch. However, the Delta network is a blocking network; that is, there is no guarantee that a connection path is available through a switch even if the desired output port is otherwise available. Thus, a Delta network is potentially fast, but as traffic increases, blocking delays can be expected.

Figure 3:
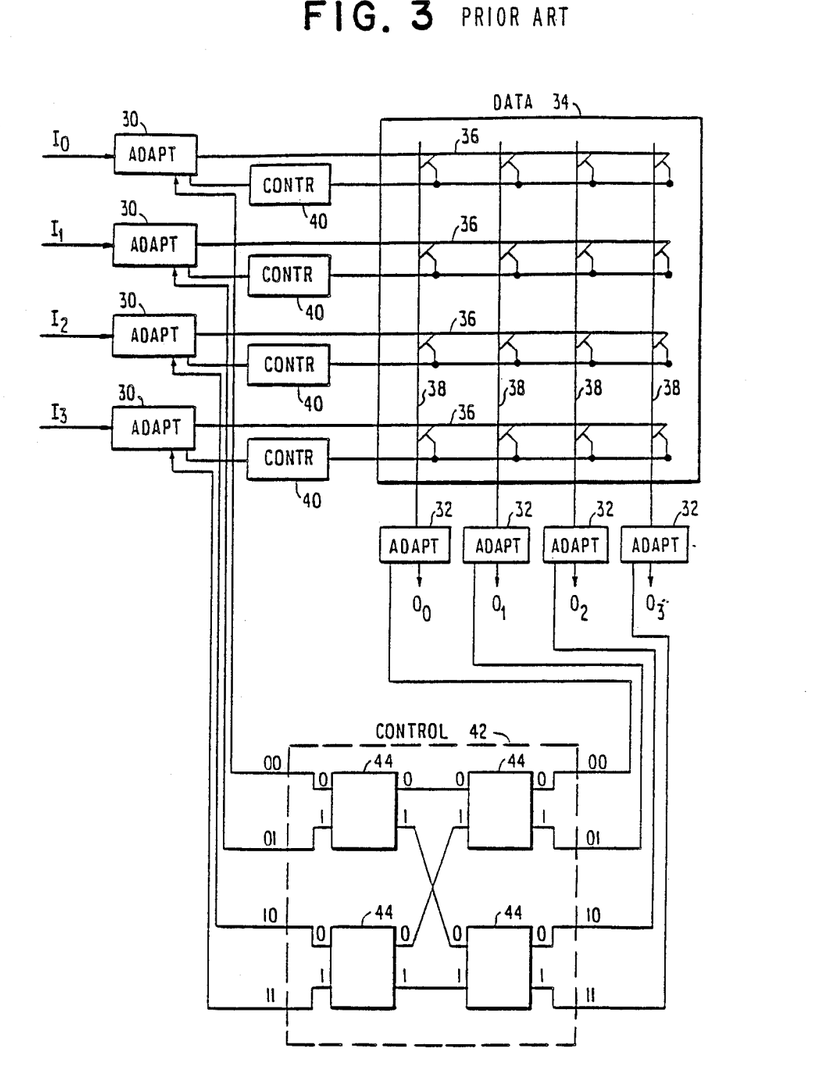
FIG. 3 is a schematic representation of an overall design which uses features of a cross-point switch and a Delta network.

Peter A. Franaszek discloses in U.S. Pat. No. 7,752,777 a switching system which combines the features of a cross-point switch and a Delta switching network by providing a non-blocking cross-point switch for data transmission and by additionally providing a Delta network switch for switching control information between the input and output ports of the cross-point switch. FIG. 3 illustrates the basic design of the Franaszek switching system for the case where N is four. Each input port is connected to a respective input adaptor 30 and each output port is connected to an output adaptor 32. A cross-point switch 34 has four horizontal lines 36 connected to the input adapters 32. At each intersection of a horizontal line 36 and a vertical line 38 is a cross-point that is individually selectable to make the connection between the respective horizontal line 36 and a vertical line 38. A cross-point controller 40 is associated with each horizontal line 36 to control the cross-points of that horizontal line 36. This arrangement is horizontally partitioned because the controllers are associated with the input ports rather than the output ports. Each cross-point controller 40 is itself controlled by associated input adaptor 30.

The cross-point switch 34 is used primarily for the selective transmission of data while a separate Delta network 42 is used primarily for the selective transmission of control information between the input adapters 30 and the output adapters 32. For N equal to four, two stages, each with two 2×2 switches 44, are required. The Delta network differs from that of FIG. 2 because each switch 44 has its own buffering and the adapters 30 and 32 also require buffering. The fundamental problem in controlling the cross-point switch 34 is to ascertain whether the desired horizontal line 36 and vertical line 38 are available. The controller 40 of the horizontally-partitioned cross-point switch is easily able to decide if its associated horizontal line 36 is available, but it is more difficult for the controller 40 to know if the desired vertical line 38 is available or whether another controller 40 has connected a different cross-point to the desired vertical line 38. The Delta network 42 provides the means of obtaining this information.

When an input adaptor 30 receives a request from its input port $I_0$–$I_3$ for a connection to a designated output port $O_0$–$O_3$, the input adaptor 30 directs this request through the Delta network 42 to the designated output adaptor 32. The adaptor 32 keeps a record of the use of its associated vertical line 38. The request that the input adaptor 30 transmits to the output adaptor 32 is in the form of a control message $S^C_{ij}$, where i is the number of the input adaptor 30 and j is the number of the output adaptor 32. A control message $S^R_{ij}$ returned to the input adaptor 30 from the output adaptor 32 provides information as to the time at which the input adaptor can initiate the sending of the message to the output adaptor. When that time arrives, the input adaptor instructs its associated controller 40 to make the cross-point connection (ij) in the cross-point switch 34 and the input adaptor 30 then proceeds to send its message. At the same time, the output adaptor 32 has prepared itself to receive the message designated by the senior member of the reservation queue.

SUMMARY OF THE INVENTION

It is therefore an object of the subject invention to provide a new crossbar switch design wherein message transfer delays are reduced to a minimum.

It is another object of the invention to provide circuitry for use in a collision crossbar switch which will not be damaged when there is a contention of two or more input sources.

It is a further object of the invention to provide an encoding scheme which will allow the unambiguous detection of colliding messages at the destination.

According to the invention, a new approach to high speed switch design is introduced. The basic feature of the invention is a collision crossbar switch. In the collision crossbar switch, there is no contention resolution but, instead, contention detection at the destination. When contention is detected, the colliding messages are routed over an alternate path, which is provided by a second interconnection network with contention resolution capability. Since contention occurs on only a fraction of the messages, the overall switching network performance is better than in schemes which resolve contention before entering the crossbar. The collision crossbar requires circuitry that allows collisions to occur without damage to the chips involved or sacrificing performance, and an encoding scheme that provides for the detection of collisions at the destination. The operation of the output circuits must be clearly established in terms of logic levels (0 or 1) only during collision free operation. When collisions occur, any voltage level is permissible, because only the presence of a collision need be detected. This is what we term "dirty logic" operation.

It will be observed that the Franaszek system described in U.S. Pat. No. 4,752,777 incorporates several of the features of the switch of the subject invention described in more detail hereinafter. In particular, it includes the description of a path hierarchy; however, the hierarchy in that system serves as a control network for a cross-point switch, rather than a means for data transmission. In addition, the system according to the subject invention is different both in the physical implementation of the cross-point switch and in the means for collision detection.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 4:
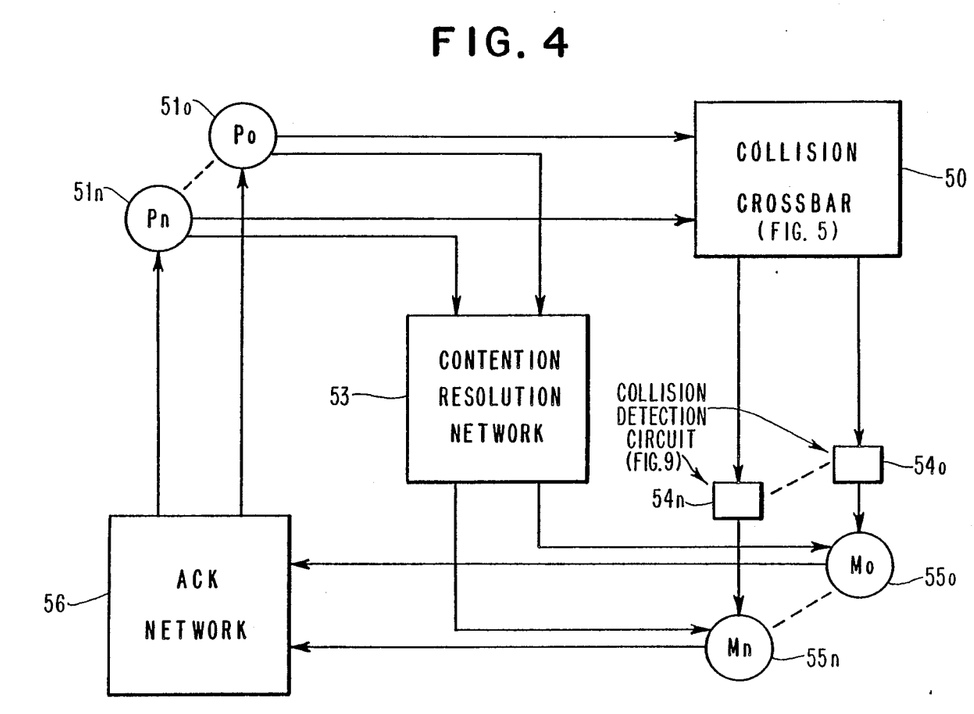
FIG. 4 is a block diagram of a possible system employing a collision crossbar switch according to the invention.

Referring now to the drawings, and more particularly to FIG. 4, there is shown a possible system employing the collision crossbar switch 50 of the invention. A plurality of sources $P_o$ to $P_n$, generally referenced as $51_o$ to $51_n$, are connected to the collision crossbar switch 50 or a contention resolution switching network 53. The contention resolution switching network 53 may be, for example, the switching network of the Franaszek application referenced above, but any switching network capable of resolving contention could be used. Normally, the sources $51_o$ to $51_n$ are connected to the collision crossbar switch 50. The outputs of the collision crossbar switch 50 are monitored by collision detectors $54_o$ to $54_n$, the outputs of which are supplied, via output ports $M_o$ to $M_n$ (referenced as $53_o$ to $55_n$, respectively), to an acknowledgement network 56. The acknowledgement network 56 may be a crossbar switch without contention detection or contention resolution, since, by definition, there are no collisions on the return path.

In operation, if there is no collision in the crossbar switch 50 as detected by one of the collision detecting circuits $54_o$ to $54_n$, an acknowledgement message is sent by the acknowledgement network 56 to the source originating the request, and the source address is extracted from the request message. However, if there is a collision, no acknowledgement message is sent. This causes the source to time-out and, as a result, it then re-sends the request message via the contention resolution network 53 which then routes the message to one of the output ports $55_o$ to $55_n$. Thus, while the network routes multiple independent messages, only the ones that have collided need be routed to the contention resolution network 53. All other messages can go through the collision crossbar 50.

Figure 5:
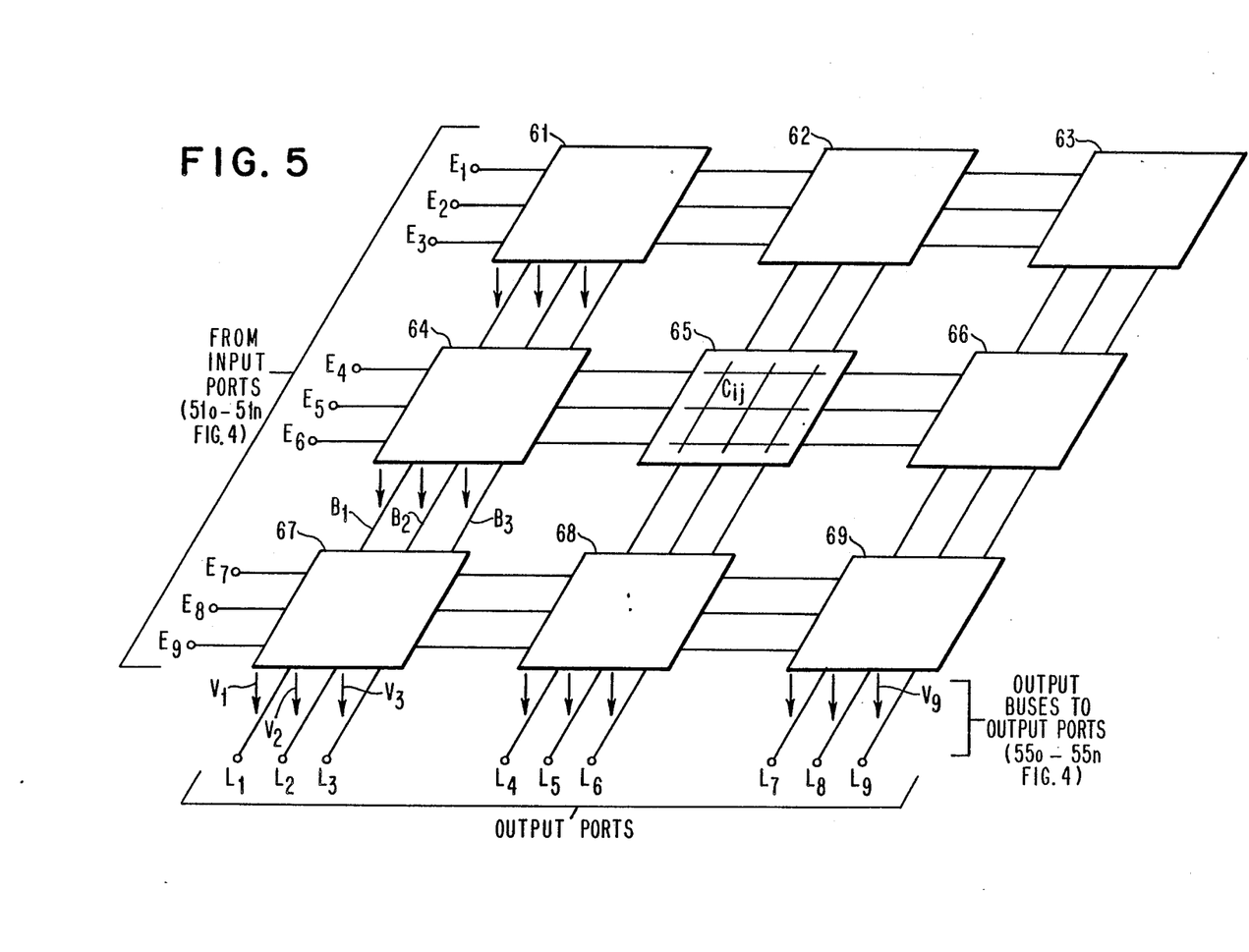
FIG. 5 is a block diagram of an NxM double-sided crossbar switch according to the invention.

The layout of the crossbar switch according to the invention is shown in FIG. 5. The crossbar switch has N input ports $E_i$ and M output ports $L_j$. In the example illustrated N=M=9, and the crossbar is composed of an array of nine chips 61 to 69, shown as 3×3 input/output chips; however, those skilled in the art will understand that this example is merely illustrative and that the crossbar switch can take any configuration. The switching chips themselves may be of the type disclosed in U.S. Pat. No. 4,635,250 issued to Christos J. Georgiou. The array of crossbar chips provide an NxM array of cross-points $C_{ij}$. The output ports $L_j$ are, in turn, connected to output buses $V_j$.

Assume that a source initiates a transmission to a destination via an input port $E_i$ and an output bus $V_j$ by setting an appropriate cross-point $C_{ij}$. The message $M_{ij}$ can then be transmitted. Each cross-point $C_{ij}$, i=1,2,...,N, along with the output bus $V_j$ leading to output port $L_j$ may be regarded as a bus $B_j$ with input ports $E_i$, i=1,2,...,N, and output port $L_j$. It is desirable to have the circuitry associated with this bus be configured so as to obtain what is known as a tri-state bus. This has the advantage that its data rate is high for a given level of technology, but it has the disadvantage that in the standard configuration, one must assure that only one input $E_i$ is transmitting at a given time, as otherwise output transistors on the chips may burn out. This is because each output from a switch chip to an output bus $V_j$ has one source and one sink transistor. If more than one input port $E_i$ is active concurrently, a source transistor may feed current back into a sink transistor, thereby causing damage. This is generally prevented by doing contention resolution on entry to the crossbar; that is, by excluding all but one of the inputs $E_i$ wishing to transmit to a given output port $L_j$.

The invention provides a means for preventing damage to the output transistors which does not require excluding all but one of the inputs $E_i$. This permits the crossbar to be used for the provision of M collision buses $B_j$. It is assumed for simplicity that each bus $B_j$ operates as a slotted bus; that is, time is partitioned into intervals of uniform length T and a message $M_{ij}$ is contained entirely within a single such interval. Each output source transistor to a given output bus $V_j$ is provided with a current limiting circuit. If a condition exists during which, on a given output bus $V_j$, an active source transistor is supplying current directly to an active sink transistor, then the current limiting circuit at the source transistor detects the current overload and shuts off.

Figure 6:
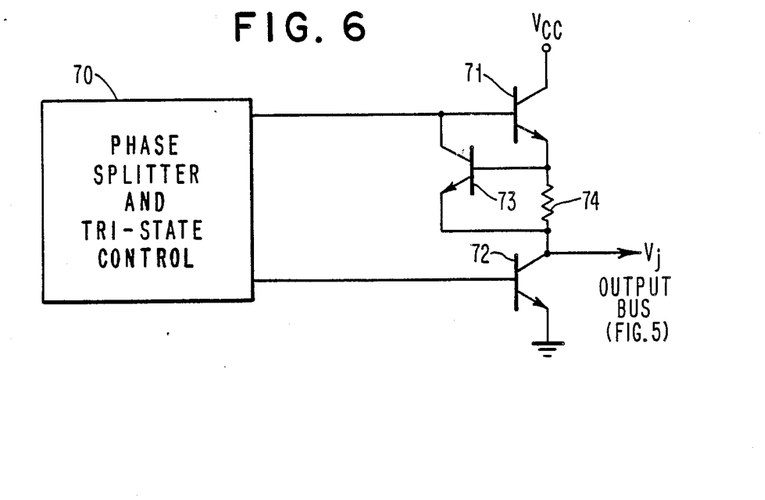
FIG. 6 is a schematic diagram of an output stage with current limiting in TTL technology.

FIG. 6 shows in detail how this is done using TTL circuitry. The driver stage consists of source transistor 71, sink transistor 72, current detecting transistor 73, and resistor 74. More specifically, the source transistor 71 is an NPN transistor connected as an emitter follower with the sink transistor 72, also an NPN transistor, being connected as the load. The bases of these two transistors are driven by a phase splitter and tri-state control 70 of conventional design. Connected between the emitter of transistor 71 and the collector of transistor 72 is a small current measuring resistor 74. The current detecting transistor 73 is an NPN transistor having its base connected to the emitter of transistor 71 and its emitter connected to the collector of transistor 72. Thus, the voltage drop across resistor 74 establishes a base bias for detecting transistor 73. The collector of transistor 73 is connected to the base of transistor 71. Transistor 73 is normally non-conducting.

When a bus contention occurs, the excess current drawn from transistor 71 generates voltage drop across resistor 74 which turns transistor 73 on. This, in turn, diverts the current away from the base of transistor 71, effectively shutting it off. The current limiting will occur at approximately 20 ma (for a value of 33 ohms for resistor 74). A smaller resistor would be needed to current limit at higher values.

Figure 7:
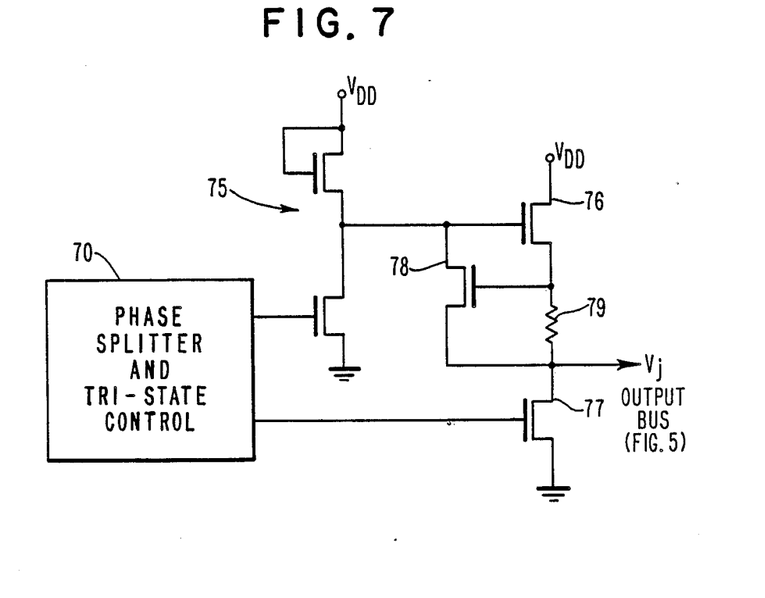
FIG. 7 is a schematic diagram of an alternate output stage with current limiting in MOS technology.

FIG. 7 shows the same circuit implementation in MOS technology. This circuit comprises FET transistors 76, 77 and 78 corresponding to bipolar transistors 71, 72 and 73, respectively, and a resistor 79 corresponding to current measuring resistor 74 in FIG. 5. The same phase splitter and tri-state control 70 may be used, but a level shifting circuit 75 is required to drive current source FET transistor 76. In this technology, the current sensing transistor 78 reduces the voltage at the gate of transistor 76, effectively shutting it off.

The circuits of FIGS. 6 and 7 are used to connect IC chips 61 through 69 of FIG. 5 to the buses $V_1$ to $V_9$.

These circuits are, in effect, the off-chip drivers (OCDs) for those chips. Similar circuits may be used on the chip. For example, with reference to FIG. 8, the bit-stream that feeds into an address decoder, e.g., line 1 entering decoder $80_1$, comes out of the decoder and may enter a bus $B_j$ via a corresponding cross-point, e.g., $81_1$. The output of the decoder may drive multiple columns $B_j$. Looking at FIG. 8, it is clear that contention may occur if more than one of the decoders attempt to drive the same column $B_j$. By using the circuits of FIGS. 6 or 7, contention will not damage the chip.

We refer to the switching functions performed in these circuits as "dirty logic" in that the value of the output to each output port $L_j$ is, given more than one input port $E_i$ transmitting, not clearly defined (and not necessarily "binary"), since the number of output transistors disabled is a function of the message contents as well as race conditions. However, the output is "clean" when only one input port $E_i$ is transmitting.

Figure 8:
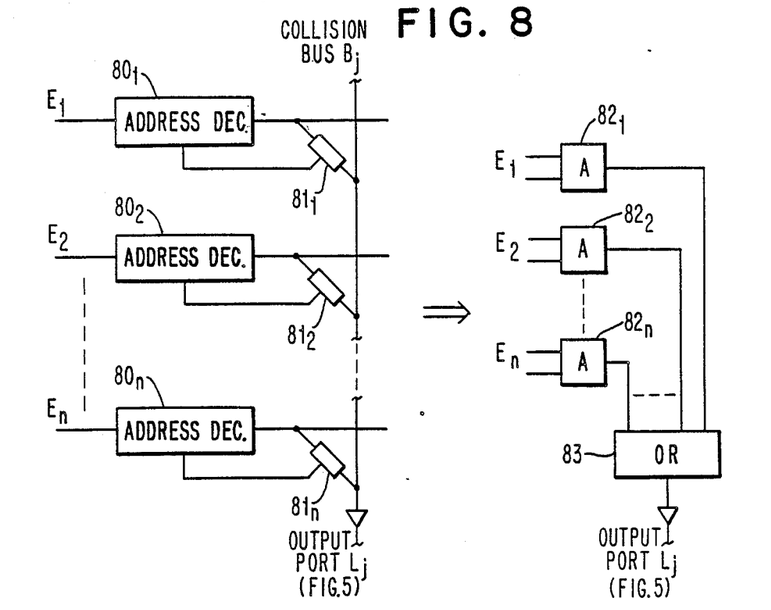
FIG. 8 is a block and logic diagram showing the logical equivalence of a collision bus.

Besides protecting the switching transistors in the event of simultaneous transmission by more than one input port $E_i$, the invention also provides a data encoding scheme which guarantees the detection of garbage in the event of collisions. A collision bus $B_j$ could be viewed as a logical OR-gate as shown in FIG. 8. More specifically, an output port $L_j$ is shown as part of a collision bus $B_j$ to which are connected a plurality of input ports $E_i$. These input ports are shown as connected to a plurality of address decoders $80_1$, $80_2$, ..., $80_n$, the outputs of which control the cross-point switches $81_1$, $81_2$, ..., $81_n$ that make the actual connections to the collision bus $B_j$. The logic of this circuit is equivalent to the plurality of AND gates $82_1$, $82_2$, ..., $82_n$ having their outputs connected to an OR gate 83. When only one input port $E_j$ is active, the bits transmitted from that port appear at the output port $L_j$. But when more than one input is active, then, if the transmitted bits have different polarity, the output port $L_j$ receives garbage; that is, nonmeaningful data.

The collision detection mechanism is configured as follows: All requests transmitted to the memory modules via the collision crossbar are synchronized so that their transmission starts at the beginning of the same system clock cycle. In order to allow for collision detection, a bit sequence in the request which is unique to the input port $E_i$, such as, for example, its address, is encoded in the collision detection code before transmission. At the output port $L_j$, the encoded bits are checked for code violation errors.

A suitable encoder for inserting the collision code in the bit stream is a memory table lookup. For an example of a typical application, 1296 valid combinations for a 2-byte input port address field would require a 64K×16 bit high speed memory at each switch port. The 1296 valid combinations are represented by eleven bits (i.e., $2^{10}$ is 1024 and $2^{11}$ is 2048). An 11-bit destination address, therefore, is used to address the translation table. The selected entry contains a preloaded 16-bit word, which represents a valid combination. This word is read out into a shift register for serial transmission to the crossbar, along with the rest of the message.

The code is designed so that each half byte of transmitted information has the same number of zeros and ones. Valid half-bytes would therefore be 1100, 1010, 1001, 0101, 0011, 0110. If a collision occurs, the balance of zeros and ones will be disturbed. The detection of a valid code can be done by the circuit in FIG. 9. The collision detection circuit comprises a 4-bit shift register 95 and six AND gates 96 to 101, inclusive. The AND gates comprise the actual decoding network, each AND gate providing an output if, and only if, its particular code is detected in the shift register 95. Thus, at most, only one AND gate will produce an output for any one of the valid codes temporarily stored in shift register 95. The OR gate 102 receives the outputs of the decoder AND gates and provides an output only when a valid code is detected. This output is clocked by the system clock to determine whether a collision has been detected, and if it has, to take remedial action such as rerouting the message to an alternative network having collision resolution capabilities.

Figure 9:
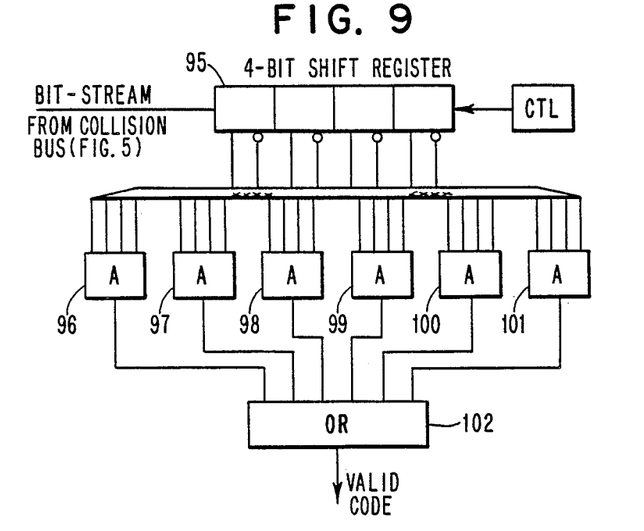
FIG. 9 is a block and logic diagram of a code violation detection mechanism.

One collision detection circuit of the type shown in FIG. 9 is required for each collision bus $B_j$. As shown, the detection of the code violation can be implemented with a minimal number of circuits. The balanced zeros and ones code allows for six-out-of-sixteen possible combinations for a 4-bit wide word. This would translate to $6^4$ or 1296 valid combinations for a 2-byte input port address field.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A collision crossbar switch comprising:
   an array of NXM cross-points $C_{ij}$, said array having N input ports and M output ports, said output ports being connected to corresponding output buses and each of said input ports being selectively connectable to any one of said output buses via said output ports;
   current detecting and limiting means for connecting said output ports to said buses for limiting current through said cross-points when a contention occurs as the result of more than one of said input ports being simultaneously connected to any one of said output buses; and
   collision detecting means connected to each of said output buses for detecting a contention on a bus and initiating a remedial action in the event a contention is detected.

2. The collision crossbar switch recited in claim 1 wherein messages transmitted on each of said input ports are preceded by a collision detection code and all messages are synchronized to start at a common system clock and wherein said collision detecting means comprises a plurality of decoders, one decoder connected to each of said output buses, for detecting a valid collision code.

3. The collision crossbar switch recited in claim 1 wherein said current detecting and limiting means comprises:
   source transistor means, sink transistor means and current detector transistor means, each having first and second current conducting electrodes and a control electrode, the control electrode of said source transistor being connected to said crosspoints and the first conducting electrode of said sink transistor means being connected to said output buses; and
   resistor means connected between the second current conducting electrode of said source transistor means and the first current conducting electrode of said sink transistor means, the first current conducting electrode of said current detector transistor means being connected to the control electrode of said source transistor means, the second current conducting electrode of said current detector transistor means being connected to the first current conducting electrode of said sink transistor means and the control electrode of said current detector transistor means being connected to the first current conducting electrode of said sink transistor means so that an increase in current through said resistor means causes said current detecting transistor means to conduct thereby turning off said source transistor means.

4. The collision crossbar switch recited in claim 3 wherein said transistor means are bipolar transistors.

5. The collision crossbar switch recited in claim 3 wherein said transistor means are FETs.

6. An NxM collision crossbar switch having N input ports and M output ports, each of said output ports being connected to a corresponding tri-state output bus, said crossbar switch permitting a plurality of simultaneously transmitting input ports connected to a tri-state bus via a plurality of cross-points, current detecting and limiting means connected to said cross-points comprising:

driver transistor means for supplying current to a cross-point switch output terminal, said driver transistor having a control terminal for receiving current to turn said transistor on and off, and an output terminal for supplying current when said transistor is turned on;

sink transistor means for sinking current from said cross-point switch output terminal; and current measuring means coupled between said cross-point output terminal and said driver transistor output terminal, said current measuring means including control switch means detecting current flowing through said sink transistor means and further coupled to said driver transistor means control terminal, said control switch means drawing current from said control terminal when said current through said sink transistor means exceeds a predetermined level.

7. The collision crossbar switch according to claim 6 wherein a collision detection code is transmitted prior to the transmission of messages to each input port, said code comprising a unique binary code for each said input port, and further comprising decoder means coupled to each output port for checking said collision detection code and detecting an error if said unique binary codes are not detected.

8. The collision crossbar switch according to claim 7 wherein said unique binary codes have an equal number of ones and zeros, said decoder means detecting an error if an unequal number of binary ones and zeros are received.

9. The collision crossbar switch according to claim 8 wherein said decoder means comprises:

register means connected to each tri-state bus for temporarily storing collision detection codes preceding messages; and gate means connected to said register means for detecting said unique binary codes.

10. The collision crossbar switch according to claim 6 wherein said current measuring means comprises a current measuring resistor connected between said driver transistor means and said sink transistor means, said control switch means comprising a transistor switch means having a control terminal connected to said current measuring resistor and responsive a predetermined voltage drop across said resistor for turning on said transistor switch means.

11. The collision crossbar switch according to claim 10 wherein said driver transistor means and said sink transistor means are composed of bipolar transistors.

12. The collision crossbar switch according to claim 10 wherein said driver transistor means and said sink transistor means are composed of FET transistors.

13. A method of operating a crossbar switch in a digital communications network comprising the steps of:

encoding collision detection codes preceding messages supplied to inputs of said crossbar switch;

allowing simultaneous transmission from more than one input to a common output of said crossbar switch; and monitoring at an output of said crossbar switch the collision detection codes to detect a contention between messages.

14. The method recited in claim 13 wherein said crossbar switch comprises an NxM array of cross-points connected to tri-state output buses, further comprising the step of limiting current flowing at each said cross-point when more than one message contends for an output bus.

15. The method recited in claim 13 further comprising the step of rerouting a message to an alternate network having contention resolution capabilities in the event that a contention between messages is detected.

16. The method recited in claim 13 wherein said collision detection codes are encoded in a unique portion of the messages.

17. The method recited in claim 16 wherein said unique portion of the messages is a course address.

18. The method recited in claim 13 further comprising the step of synchronizing the transmission of messages from said inputs.

19. A collision crossbar switch comprising:

an array of cross-points, said array having a first plurality of input ports and a second plurality of output ports, said output ports being connected to corresponding output buses and each of said input ports being selectively connectable to any one of said output buses via said output ports and wherein messages transmitted on each of said input ports are preceded by a collision detection code and all messages are synchronized to start at a common system clock; and collision detecting means connected to each of said output buses for detecting a contention on a bus and initiating a remedial action in the event a contention is detected, said collision detecting means including a plurality of decoders, one decoder connected to each of said output buses, for detecting a valid collision code.

20. The collision crossbar switch recited in claim 19 wherein said collision detection codes are encoded in a unique portion of the messages and said plurality of decoders each comprise:

a shift register connected to receive binary data corresponding to said unique portion; and decoding logic to detect one of a plurality of valid collision detection codes.

21. The collision crossbar switch recited in claim 20 wherein said unique portion is a source address.

* * * * *